US012405348B2

(12) United States Patent
Kuroiwa

(10) Patent No.: US 12,405,348 B2
(45) Date of Patent: Sep. 2, 2025

(54) LOCATION ESTIMATION APPARATUS, FACILITY DEVICE SYSTEM, LOCATION ESTIMATION METHOD, AND RECORDING MEDIUM

(71) Applicant: Mitsubishi Electric Corporation, Tokyo (JP)

(72) Inventor: Takeru Kuroiwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 289 days.

(21) Appl. No.: 18/044,804

(22) PCT Filed: Nov. 24, 2020

(86) PCT No.: PCT/JP2020/043682
§ 371 (c)(1),
(2) Date: Mar. 10, 2023

(87) PCT Pub. No.: WO2022/113172
PCT Pub. Date: Jun. 2, 2022

(65) Prior Publication Data
US 2023/0366978 A1    Nov. 16, 2023

(51) Int. Cl.
*G01S 5/12*          (2006.01)
*G01S 5/02*          (2010.01)
(52) U.S. Cl.
CPC .............. *G01S 5/12* (2013.01); *G01S 5/0284* (2013.01)
(58) Field of Classification Search
CPC ........... G01S 5/12; G01S 5/0284; G01S 5/026
See application file for complete search history.

(56) References Cited

U.S. PATENT DOCUMENTS

| 10,346,657 | B1 * | 7/2019 | White | G06K 7/10445 |
| 10,911,897 | B2 * | 2/2021 | Vincent | G01C 21/206 |
| 2017/0094750 | A1 | 3/2017 | Chen | |

(Continued)

FOREIGN PATENT DOCUMENTS

| JP | 2006-105662 A | 4/2006 |
| JP | 2006-229845 A | 8/2006 |

(Continued)

OTHER PUBLICATIONS

Office Action dated Aug. 8, 2023, issued for the corresponding JP patent application No. 2022-564856 (and English translation).

(Continued)

*Primary Examiner* — Anthony S Addy
(74) *Attorney, Agent, or Firm* — Posz Law Group, PLC

(57) ABSTRACT

In a second facility device whose installation location is unknown, a relative location estimator measures a wireless signal transmitted by a first facility device whose installation location is known and estimates a relative location between the first facility device and the second facility device. In a controller, a relative location receiver receives information indicating the relative location sent by the second facility device. An absolute location estimator estimates an absolute location of the second facility device based on the relative location indicated by the information received by the relative location receiver, the installation location of the first facility device, and installation specifications stipulated for the facility devices.

5 Claims, 10 Drawing Sheets

(56) References Cited

U.S. PATENT DOCUMENTS

| | | | |
|---|---|---|---|
| 2018/0267137 A1 | 9/2018 | Gura | |
| 2019/0394209 A1* | 12/2019 | Urabe | ................. G01S 5/12 |
| 2020/0011959 A1* | 1/2020 | Abou-Rizk | ........... G01S 5/0289 |
| 2022/0276334 A1 | 9/2022 | Kuroiwa | |
| 2023/0046536 A1 | 2/2023 | Katsukura | |

FOREIGN PATENT DOCUMENTS

| | | |
|---|---|---|
| JP | 2019-039877 A | 3/2019 |
| WO | 2016/125489 A1 | 8/2016 |
| WO | 2021/079509 A1 | 4/2021 |
| WO | 2021/192222 A1 | 9/2021 |
| WO | 2021/255874 A1 | 12/2021 |

OTHER PUBLICATIONS

International Search Report of the International Searching Authority mailed Feb. 16, 2021 for the corresponding International application No. PCT/JP2020/043682 (and English translation).
Extended European Search Report dated Dec. 19, 2023, in the corresponding EP Patent Application No. 20963437.7.

* cited by examiner

LOCATION ESTIMATION APPARATUS, FACILITY DEVICE SYSTEM, LOCATION ESTIMATION METHOD, AND RECORDING MEDIUM

CROSS REFERENCE TO RELATED APPLICATION

This application is a U.S. national stage application of PCT/JP2020/043682 filed on Nov. 24, 2020, the contents of which are incorporated herein by reference.

TECHNICAL FIELD

The present disclosure relates to a location estimation apparatus, a facility device system, a location estimation method, and a program.

BACKGROUND ART

Facility devices, such as air conditioners, lighting devices, and the like, are installed heretofore within a floor of a building such as an office building and a commercial building. Such a facility device is controlled by a controller connected in a wired or wireless manner for users on the floor to spend time comfortably. For example, the controller controls nearby facility devices properly in accordance with a location of a user on the floor to enhance user comfort. For this control, the controller stores information about where the facility devices are installed, that is, information about installation locations. Such an installation location has generally been set by a worker who makes measurements relating to the facility device, but a mechanism for the controller to automatically estimate the installation location of the facility device is also being developed.

For example, Patent Literature 1 discloses a technique of estimating a location of a wireless device by a location estimation apparatus through transmission and reception of a wireless signal between wireless devices. This location estimation device estimates the location of the wireless device based on (i) an inter-device distance that is a distance between one wireless device and another wireless device and is measured by the one wireless device, (ii) measurement data relating to reliability of the inter-device distance, and (iii) the inter-distance distances and measurement data that are previously collected.

CITATION LIST

Patent Literature

Patent Literature 1: International Publication No. WO 2016/125489

SUMMARY OF INVENTION

Technical Problem

However, the location estimation apparatus disclosed in Patent Literature 1 uses the previously collected inter-device distances and measurement data, and is thus intended to increase the accuracy gradually in a process of repetitive estimation of the location of the wireless device. Thus, the accuracy in the first attempt of estimation of the location of the wireless device might be insufficient. That is, the location estimation apparatus disclosed in Patent Literature 1 has difficulties due to the requirement for repetitive estimation of the location on multiple occasions for sufficient accuracy, which takes a long time until the estimating of the location ends.

Thus, a technique of estimating the installation location of the facility device with higher accuracy without requiring a long time is needed.

In view of the above circumstances, an objective of the present disclosure is to provide a location estimation apparatus, a facility device system, a location estimation method, and a program that can estimate the installation location of the facility device with higher accuracy.

Solution to Problem

To achieve the above described objective, a location estimation apparatus according to the present disclosure is an apparatus to be communicatively connected to at least two facility devices including a first facility device whose installation location is known and a second facility device whose installation location is unknown, and includes relative location receiving means for receiving information indicating a relative location between the first facility device and the second facility device, the information being sent from any of the facility devices, and absolute location estimating means for estimating an absolute location of the second facility device based on the relative location indicated by the information received by the relative location receiving means, the installation location of the first facility device, and installation specifications stipulated for the facility devices.

Advantageous Effects of Invention

In the location estimation apparatus according to the present disclosure, the relative location receiving means receives information indicating a relative location between the first facility device and the second facility device, sent from any of the facility devices, and the absolute location estimating means estimates an absolute location of the second facility based on the relative location indicated by the received information, the installation location of the first facility device, and the installation specifications stipulated for the facility devices. As a result, the installation location of the facility device can be estimated in higher accuracy.

DESCRIPTION OF EMBODIMENTS

Figure 1:
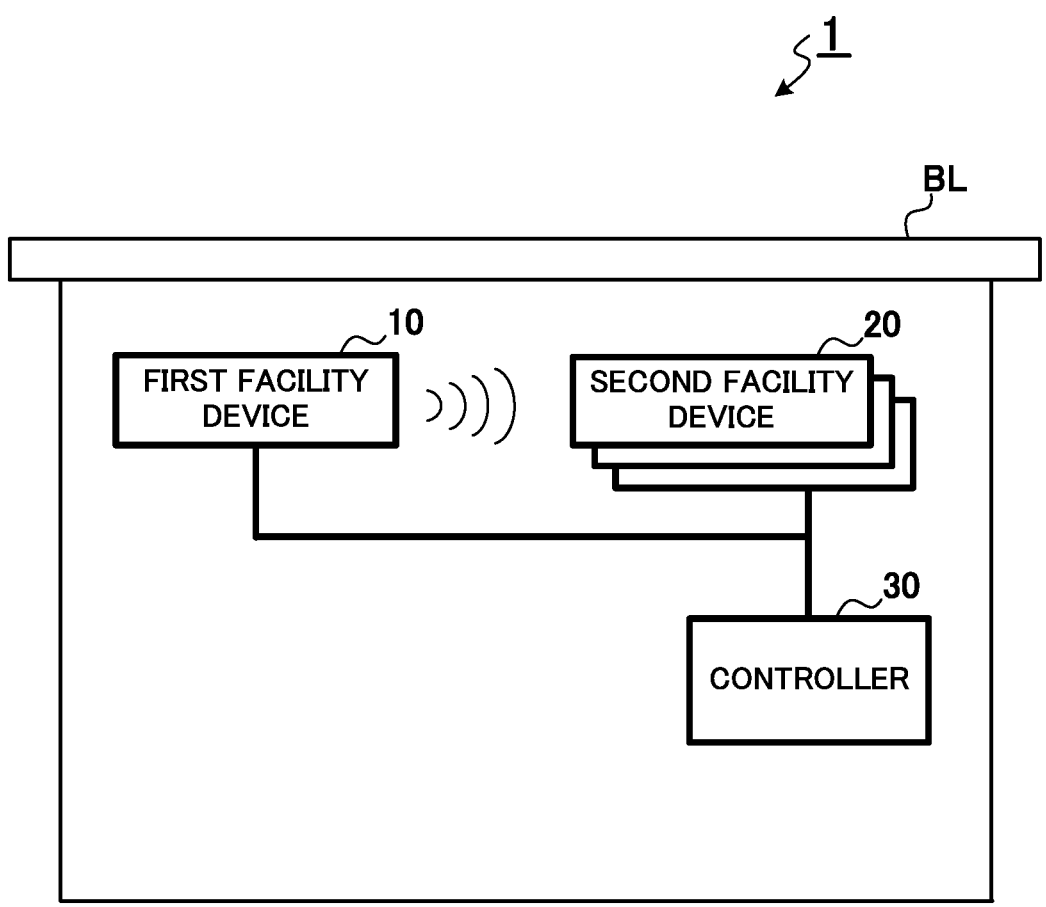
FIG. 1 is a diagram illustrating an example of an overall configuration of a facility device system according to Embodiment 1 of the present disclosure.

Embodiments of the present disclosure are hereinafter described in detail with reference to the drawings. Throughout the drawings, like or corresponding parts are designated by the same reference numerals. In the following description, a facility device system in which facilities such as air conditioners, lighting devices, and the like are installed in a building is described as an example of the facility device system, but types of the facility devices can be freely selected, and the present disclosure can also be applied similarly to the facility device system in which other types of devices are installed. In other words, the embodiments described below are for explanatory purposes and are not for restricting the scope of the present disclosure. Thus, one of the ordinary skill in the art can adopt embodiments obtained by replacing each or all of the elements with equivalents to the elements, and such embodiments are included in the scope of the present disclosure. That is, the present disclosure is not limited to the embodiments described below and various modifications can be made without departing from the spirit of the present disclosure.

Embodiment 1

FIG. 1 is a schematic diagram illustrating an example of an overall configuration of a facility device system 1 according to Embodiment 1 of the present disclosure. The facility device system 1 is a system in which facility devices, such as air conditioners, lighting devices, and the like, are installed in a building BL, and includes a first facility device 10 whose installation location is known, a second facility device 20 whose installation location is unknown, and a controller 30. FIG. 1 illustrates the facility device system 1 that includes a single first facility device 10 and a plurality of second facility devices 20, but this is just an example and the facility device system 1 may also include a plurality of first facility devices 10.

Figure 2:
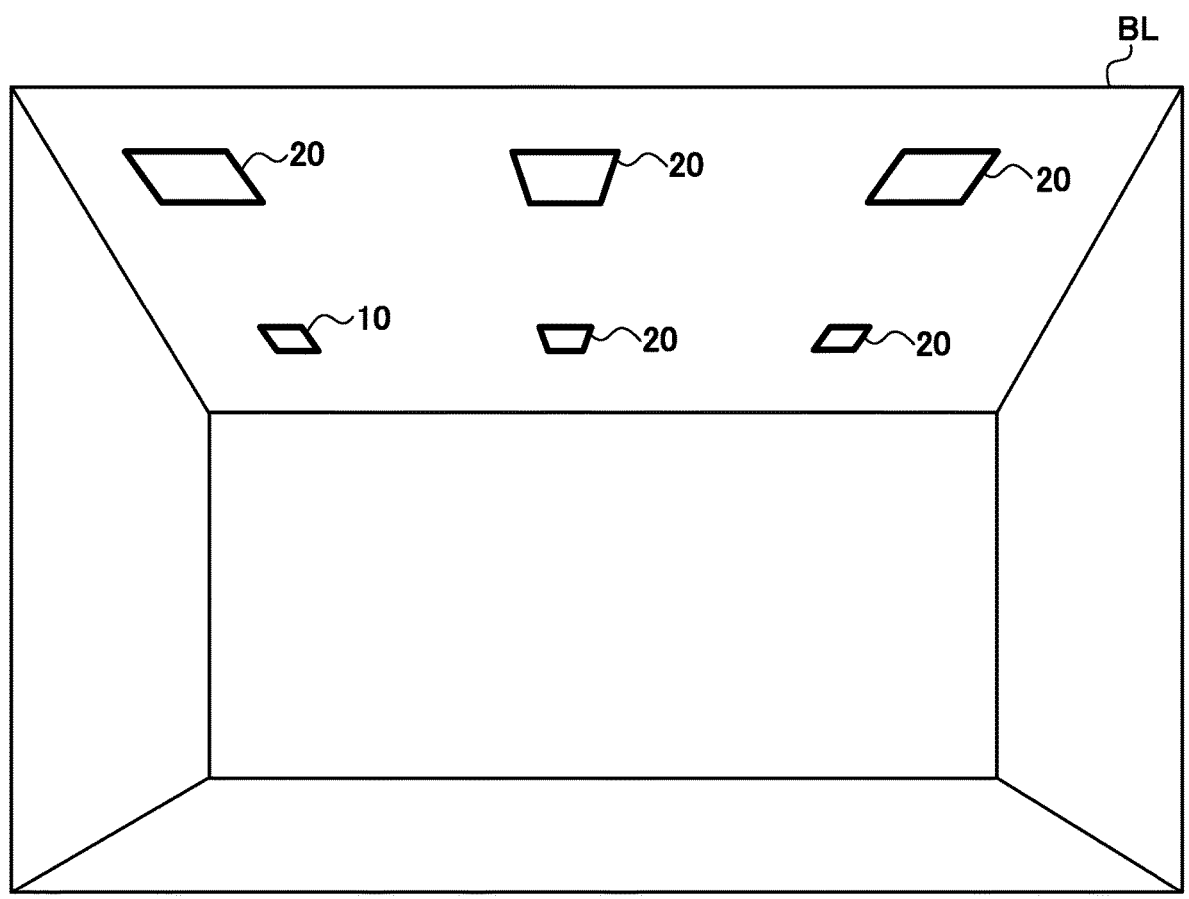
FIG. 2 is a diagram for illustrating how facility devices are installed.

The facility devices, that is, the first facility device 10 and the second facility device 20, are installed, for example, on the ceiling in the building BL as illustrated in FIG. 2. The first facility device 10 and the second facility devices 20 are installed in accordance with rules stipulated in installation specifications described later. As described above, the installation location of the first facility device 10 is known, while the installation location of the second facility device 20 is unknown. Although FIG. 2 also illustrates the facility device system 1 in which a single first facility device 10 is installed, a plurality of first facility devices 10 may be installed as described above.

Again with reference to FIG. 1, the controller 30, which is an example of the location estimation apparatus in the present disclosure, is connected to the first facility device 10 and the second facility devices 20 in a wired or wireless manner. Before controlling the first facility device 10 and the second facility devices 20, the controller 30 estimates an absolute location of the second facility device 20 whose installation location is unknown, as described later.

Figure 3:
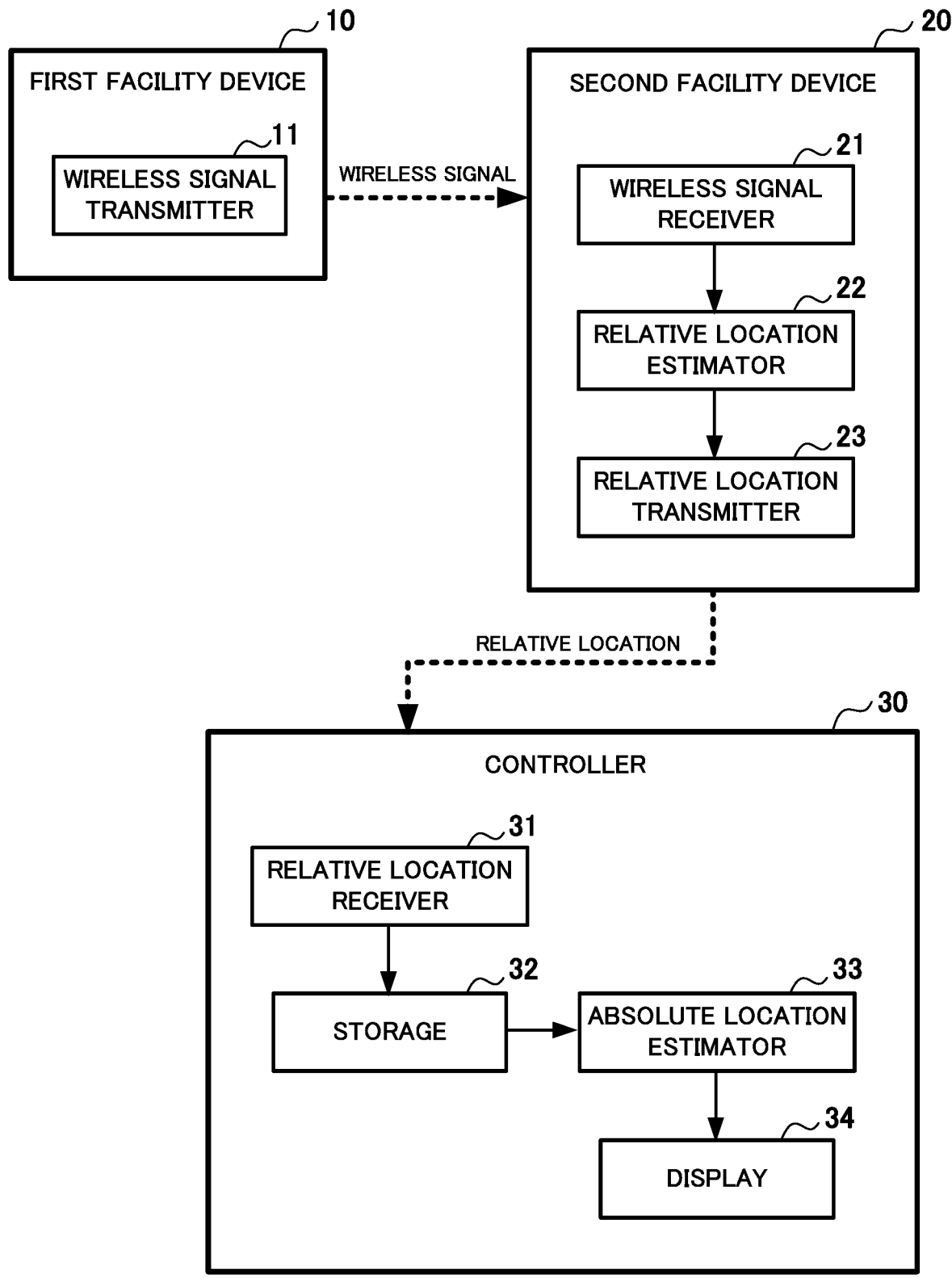
FIG. 3 is a diagram illustrating an example of a configuration of a first facility device, a second facility device, and a controller according to Embodiment 1 of the present disclosure.

The facility device system 1 is described below in detail with reference to FIG. 3. FIG. 3 is a block diagram illustrating an example of a configuration of the first facility device 10, the second facility device 20, and the controller 30 according to Embodiment 1 of the present disclosure.

First, the first facility device 10 includes a wireless signal transmitter 11, which is an example of wireless signal transmitting means.

The wireless signal transmitter 11 transmits a wireless signal compliant with wireless standards, for example, Bluetooth (registered trademark) Low Energy, Wi-Fi, or the like. This wireless signal includes a device ID for identifying the first facility device 10. That is, the wireless signal transmitter 11 transmits within the floor the wireless signal including its own device ID.

Also, the first facility device 10 further includes not-illustrated main function units. For example, in a case where the first facility device 10 is an air conditioner, the first facility device 10 further includes a configuration for achieving air-conditioning functions such as cooling, heating, and dehumidification.

Next, the second facility device 20 includes a wireless signal receiver 21, which is an example of wireless signal receiving means, a relative location estimator 22, which is an example of relative location estimating means, and a relative location transmitter 23, which is an example of relative location transmitting means. The relative location estimator 22 is implemented, for example, by a central processing unit (CPU) using a random access memory (RAM) as working memory and executing a program stored in a read-only memory (ROM) as appropriate.

The wireless signal receiver 21 receives a wireless signal transmitted by the first facility device 10. Then the wireless signal receiver 21 measures a radio wave intensity and a phase difference of the received wireless signal. Then the wireless signal receiver 21 extracts the device ID included in the wireless signal and associates this device ID with a result of the measurement.

The relative location estimator 22 estimates a relative location between the first facility device 10 and the second facility devices 20 based on the radio wave intensity and the phase difference measured by the wireless signal receiver 21.

For example, the relative location estimator 22 calculates a distance between the first facility device 10 and its own device, that is, the second facility device 20 based on the radio wave intensity measured by the wireless signal receiver 21. The relative location estimator 22 also calculates an angle between the first facility device 10 and its own device based on the phase difference measured by the wireless signal receiver 21. Then the relative location estimator 22 estimates a relative location between the first facility device 10 and its own device based on the calculated distance and angle.

The relative location transmitter 23 transmits, to the controller 30, information indicating the relative location estimated by the relative location estimator 22. The relative location transmitter 23 adds the device ID of the first facility device 10 extracted by the wireless signal receiver 21 and the device ID of its own device to the information indicating the relative location so as to be able to identify which first facility device 10 and which second facility device 20 the relative location is between.

In addition, the second facility device 20 further includes not-illustrated function units. For example, in a case where the second facility device 20 is an air conditioner, the second facility device 20 further includes a configuration for achieving air-conditioning functions such as cooling, heating, and dehumidification.

Next, the controller 30 includes a relative location receiver 31, which is an example of relative location receiving means, a storage 32, an absolute location estimator 33, which is an example of absolute location estimating means, and a display 34, which is an example of display means. The absolute location estimator 33 is implemented, for example, by a CPU using a RAM as working memory and executing a program stored in a ROM as appropriate.

The relative location receiver 31 receives information indicating the relative location transmitted by the second facility device 20. The relative location receiver 31 stores the received information in the storage 32.

The storage 32 stores information indicating the relative location received by the relative location receiver 31. The storage 32 also previously stores an absolute location of the first facility device 10, the installation location of which is known. The storage 32 also stores installation specifications to be applied when the facility devices, specifically, the first facility device 10 and the second facility devices 20, are installed.

Figure 4:
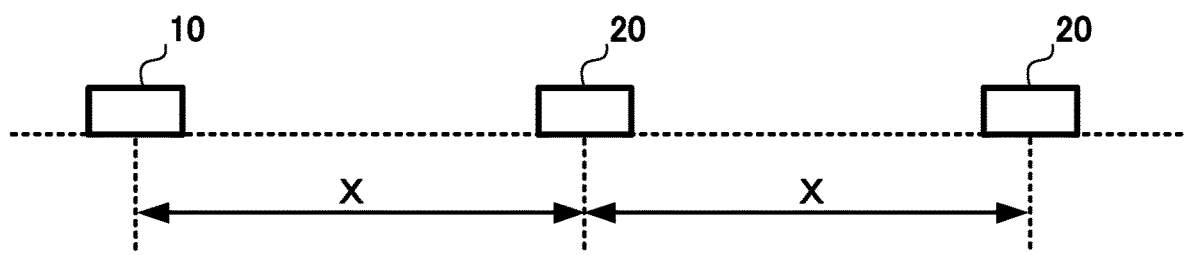
FIG. 4 is a diagram for illustrating an installation interval of the facility devices.

The installation specifications stipulate, for example, an installation interval X of the facility devices as illustrated in FIG. 4. That is, the first facility device 10 and the second facility devices 20 are stipulated to be installed precisely spaced apart from one another at the installation interval X.

Figure 5:
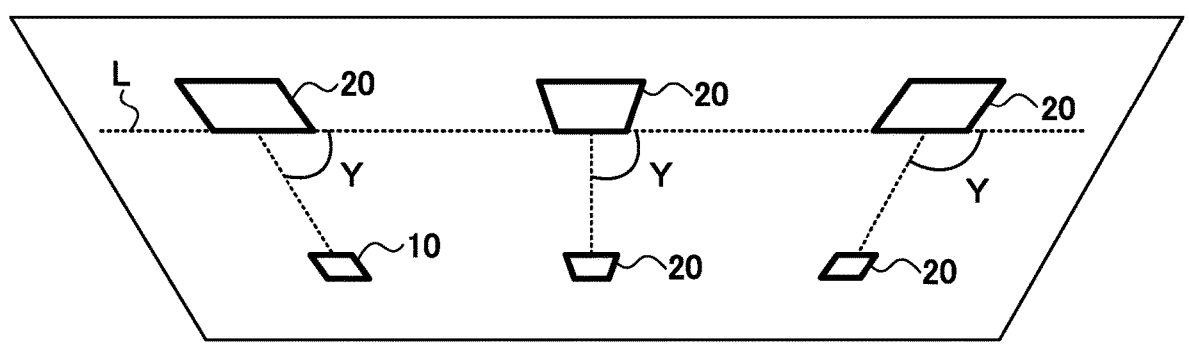
FIG. 5 is a diagram for illustrating an installation angle of the facility devices.

The installation specifications also stipulate an installation angle Y of the facility devices as illustrated in FIG. 5. That is, the first facility device 10 and the second facility devices 20 are stipulated to be installed along a reference line L, precisely, for example, at an installation angle Y with respect to the other facility devices positioned most nearby.

These installation specifications are examples and different content thereof may be stipulated. The storage 32 stores at least one of these installation specifications.

Again with reference to FIG. 3, the absolute location estimator 33 estimates an absolute location of the second facility device 20 with reference to the information stored in the storage 32. For example, the absolute location estimator 33 estimates the absolute location of the second facility device 20 based on the relative location between the first facility device 10 and the second facility device 20 indicated by the information received by the relative location receiver 31, the absolute location that is the installation location of the first facility device 10, and the installation specifications stipulated for installation of the facility devices.

Specifically, the absolute location estimator 33 uses as a reference the absolute location of the first facility device 10, the installation location of which is known, to estimate the absolute location of the second facility device 20, the installation location of which is unknown, in accordance with the relative location of the second facility device 20 with respect to this first facility device 10. In this estimation, the absolute location estimator 33 uses the above-described installation specifications to improve accuracy of the absolute location to be estimated.

For example, in a case where the above-mentioned installation interval X as illustrated in FIG. 4 is stipulated in the installation specifications, when an estimated inter-device installation distance d satisfies $X/2 \leq d < 3X/2$, the absolute location estimator 33 corrects the value of d to be X. Similarly, the estimated installation inter-device distance d satisfies $3X/2 \leq d < 5X/2$, the absolute location estimator 33 corrects the value of d to be 2X.

In a case where the above-mentioned installation angle Y as illustrated in FIG. 5 is stipulated in the installation specifications, when the estimated relative angle $\theta$ satisfies $Y - \pi/2 \leq \theta < Y + \pi/2$, the absolute location estimator 33 corrects the value of $\theta$ to be Y.

The absolute location estimator 33 estimates the absolute location of the second facility device 20 while making such corrections. Also, the absolute location estimator 33 stores in the storage 32 the estimated absolute location and the device ID of the second facility device 20 in association with each other.

The display 34 displays the installation location of each facility device. For example, the display 34 displays an icon indicating the second facility device 20 while superimposing the icon at a corresponding position on a floor plan based on the absolute location of the second facility device 20 estimated by the absolute location estimator 33. The display 34 may display an icon indicating the first facility device 10 while further superimposing the icon at a corresponding position on the floor plan similarly based on the absolute location of the first facility device 10 whose installation location is known.

Figure 6:
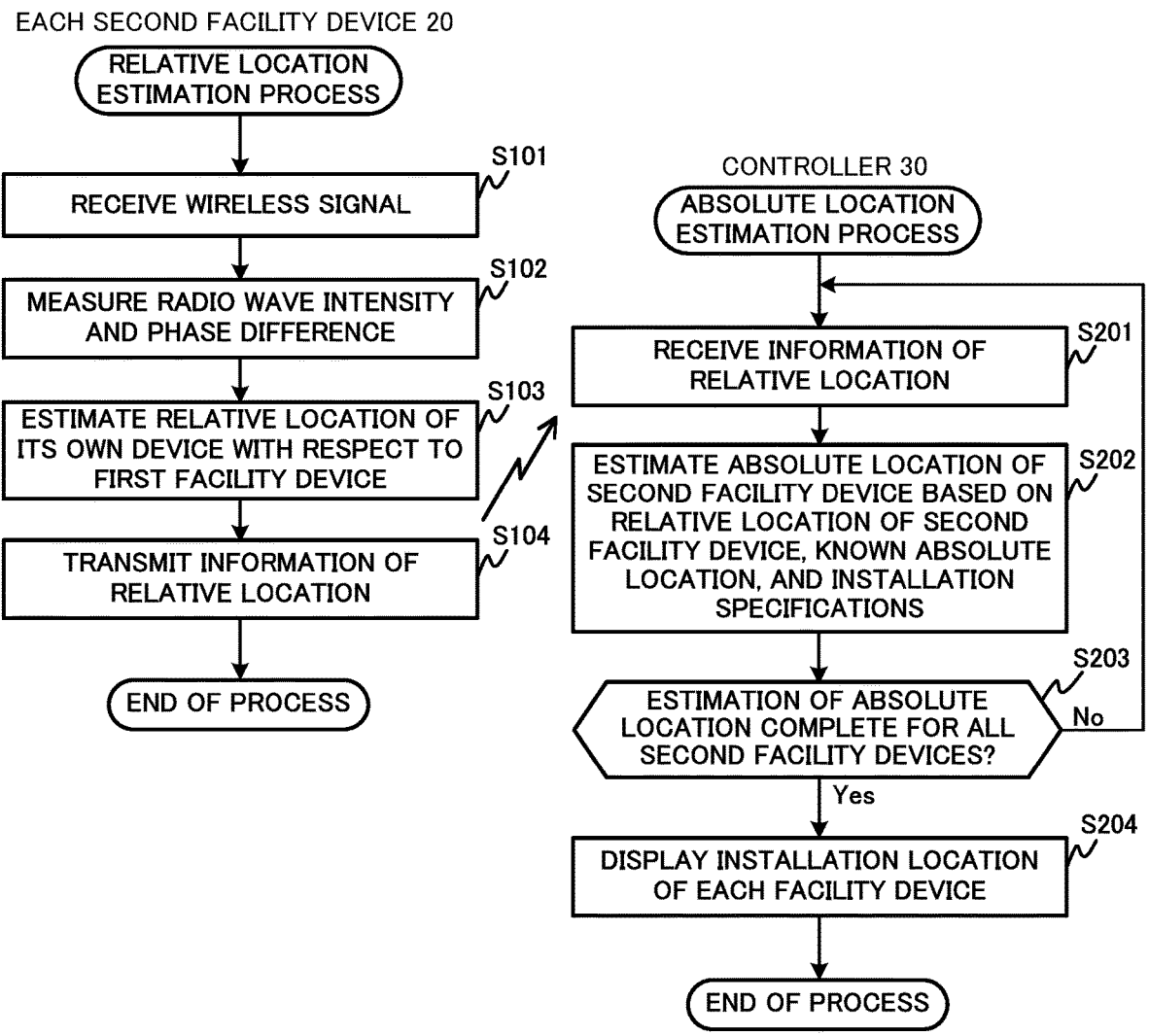
FIG. 6 is a flowchart for illustrating a relative location estimating process and an absolute location estimating process according to Embodiment 1 of the present disclosure.

Operation of the facility device system 1 having such a configuration is described below with reference to FIG. 6. FIG. 6 is a flowchart illustrating an example of a relative location estimation process and an absolute location estimation process according to Embodiment 1 of the present disclosure. The relative location estimation process, which is one of the processes, is executed by each of the second facility devices 20, and the absolute location estimation process, which is the other process, is executed by the controller 30. Although not illustrated, a process of transmitting wireless signals is assumed to be carried out in the first facility device 10 in parallel to the relative location estimation process and the absolute location estimation process. These processes are executed, for example, upon turn-on of power to the first facility device 10, the second facility device 20, and the controller 30. In addition, these processes may be executed in a case where a predetermined operation is input to the controller 30.

First, the second facility device 20 receives a wireless signal transmitted by the first facility device 10 (step S101). Specifically, upon turn-on of power, the wireless signal including the device ID is transmitted by the wireless signal transmitter 11 from the first facility device 10. The wireless signal receiver 21 then receives this wireless signal.

The second facility device 20 measures a radio wave intensity and a phase difference (step S102). Specifically, the wireless signal receiver 21 measures the radio wave intensity and phase difference for the wireless signal received in step S101.

The second facility device 20 estimates its own relative location with respect to the first facility device 10 (step S103). Specifically, the relative location estimator 22 estimates the relative location between the first facility device 10 and the second facility device 20 based on the radio wave intensity and the phase difference measured in step S102. For example, the relative location estimator 22 calculates a distance between its own device, which is the second facility device 20, and the first facility device 10 in accordance with the radio wave intensity measured by the wireless signal receiver 21. The relative location estimator 22 calculates the angle between the first facility device 10 and its own device, which is the second facility device 20, in accordance with the phase difference measured by the wireless signal receiver 21. The relative location estimator 22 then estimates its own relative location with respect to the first facility device 10 based on the calculated distance and angle.

The second facility device 20 transmits information about the relative location to the controller 30 (step S104). Specifically, the relative location transmitter 23 transmits to the controller 30 the information indicating the relative location estimated in step S103. The relative location transmitter 23 adds the device ID of the first facility device 10 and its own device ID to the information indicating the relative location so as to be able to identify which of the facility devices the relative location is between.

The controller 30 receives the information of the relative location (step S201). Specifically, the relative location receiver 31 receives the information indicating the relative location transmitted by the second facility device 20. This step S201 is an example of a relative location receiving step.

The controller 30 estimates an absolute location of the second facility device 20 based on the relative location of the second facility device 20, the known absolute location, and the installation specifications (step S202). Specifically, the absolute location estimator 33 estimates the absolute location of the second facility device 20 based on the relative location between the first facility device 10 and the second facility device 20 indicated by the information received in step S201, the relative position that is the installation position of the first facility device 10, and the installation specifications stipulated for installation of the facility device. For example, the absolute location estimator 33 uses as a reference the absolute location of the first facility device 10, the installation location of which is known, to estimate the absolute location of the second facility device 20, the installation location of which is unknown, in accordance with the relative location of the second facility device 20 with respect to the first facility device 10. In this estimation, the absolute location estimator 33 improves accuracy of the absolute location based on the installation specifications stored in the storage 32, for example, by correcting the installation interval, the installation angle, and/or the like. This step S202 is an example of an absolute location estimation step.

The controller 30 determines, for all the second facility devices 20, whether or not estimation of the absolute location is complete (step S203). In a case where the controller 30 determines that estimation for all the second facility devices 20 are not complete (No in step S203), the controller 30 returns the processing to step S201.

In a case where controller 30 determines that estimation for all the second facility devices 20 are complete (Yes in step S203), the controller 30 displays the installation location of each facility device (step S204). Specifically, the display 34, for example, displays an icon indicating the second facility device 20 while superimposing the icon at a corresponding position on a floor plan based on the absolute location of the second facility device 20 estimated in step S202. The display 34 may display an icon indicating the first facility device 10 while further superimposing the icon at a corresponding position on the floor plan based on the absolute location of the first facility device 10 whose installation location is known.

Through the relative location estimation process, the information indicating the relative location of the second facility device 20 with respect to the first facility device 10 is transmitted to the controller 30 from each second facility device 20. Through the absolute location estimation process, the absolute location of the second facility device 20 is estimated based on the relative location of the second facility device 20, the absolute location of the first facility device 10, and the installation specifications. In this estimation, accuracy of the absolute location is improved based on the installation specifications, for example, by correcting the installation interval, the installation angle, and/or the like.

This results in higher accuracy of estimation of the installation location of the second facility devices 20.

Modifications of Embodiment 1

In Embodiment 1 described above, the first facility device 10 whose installation location is known transmits a wireless signal, and the second facility device 20 whose installation location is unknown measures the wireless signal, estimates the relative location of the second facility device 20 with respect to the first facility device 10, and transmits the information about the relative location to the controller 30. However, roles of the first facility device 10 and the second facility device 20 may be switched.

Figure 7:
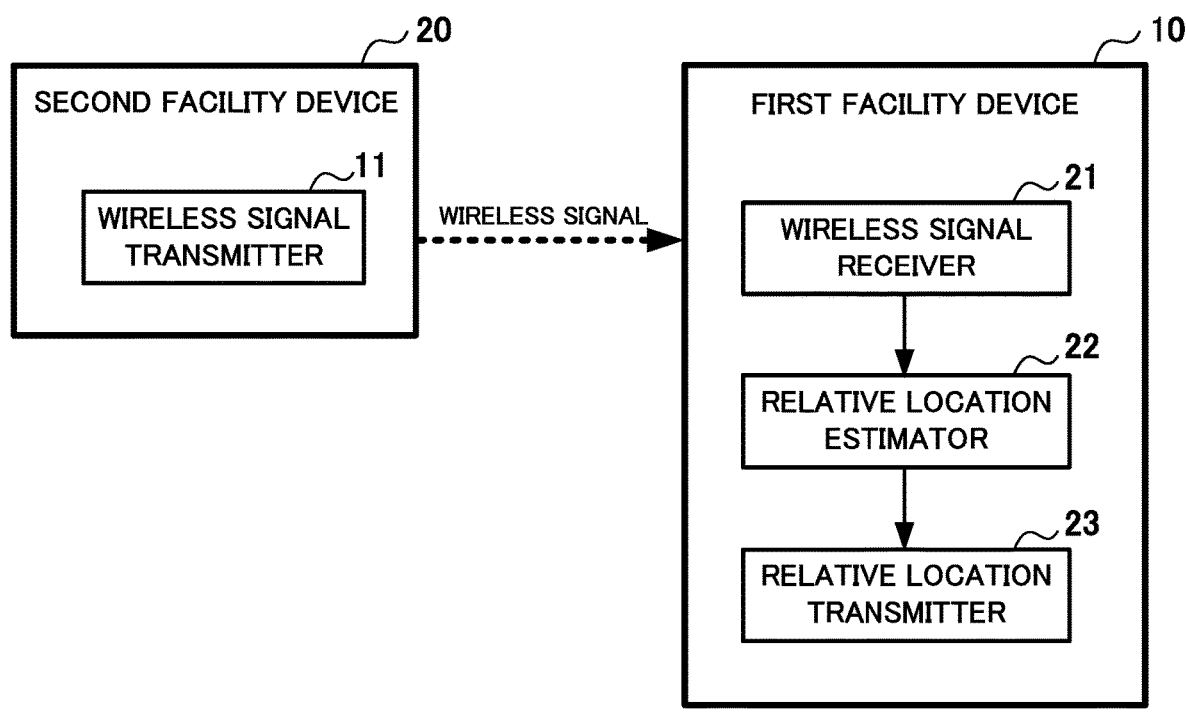
FIG. 7 is a diagram illustrating an example of a configuration of a second facility device and a first facility device according to a modification of Embodiment 1.

In other words, as illustrated in FIG. 7, the second facility device 20 may include the wireless signal transmitter 11 described above, and the first facility device 10 may include wireless signal receiver 21, the relative location estimator 22, and the relative location transmitter 23, which are described above. Specifically, the second facility device 20 whose installation location is unknown transmits a wireless signal, and the first facility device 10 whose facility device is known measures the wireless signal estimates a relative location of the first facility device 10 with respect to the second facility device 20 and transmits information about the relative location to the controller 30.

The controller 30 receives the information indicating the relative location between the first facility device 10 and the second facility device 20, and estimates an absolute location of the second facility device 20 based on the relative location, the absolute location of the first facility device 10, and the installation specifications. Similarly in this case, the installation location of the second facility device 20 can be estimated with higher accuracy.

Embodiment 2

In Embodiment 1 described above, the second facility device 20 or the first facility device 10 estimates the relative location between the first facility device 10 and the second facility device 20, but estimation of this relative location may be conducted by the controller 30. Embodiment 2 of the present disclosure is described below.

First, the first facility device 10 has the same configuration as that of Embodiment 1 illustrated in FIG. 3 described above. That is, the first facility device 10 includes the wireless signal transmitter 11, which is an example of the wireless signal transmitting means. The wireless signal transmitter 11 transmits within the floor a wireless signal including its own device ID, similarly to Embodiment 1.

Next, the second facility device 20 includes the wireless signal receiver 21, which is an example of the wireless signal receiving means, and a measurement information transmitter 24, which is an example of measurement information transmitting means. The wireless signal receiver 21 has the same configuration as that of Embodiment 1 illustrated in FIG. 3. That is, the wireless signal receiver 21 measures a radio wave intensity and a phase difference for the received wireless signal. Then the wireless signal receiver 21 extracts the device ID included in the wireless signal and associates this device ID with a result of the measurement.

The measurement information transmitter 24 transmits to the controller 30 measurement information indicating the radio wave intensity and the phase difference measured by the wireless signal receiver 21. The measurement information transmitter 24 adds the device ID of the first facility device 10 extracted by the wireless signal receiver 21 and its own device ID to the measurement information so as to be able to identify which first facility device 10 and which second facility device 20 the measurement information is between.

Next, the controller 30 includes a measurement information receiver 35, which is an example of measurement information receiving means, a relative location estimator 36, which is an example of relative location estimating means, the storage 32, the absolute location estimator 33, which is an example of the absolute location estimating means, and the display 34, which is an example of the display means. The storage 32, the absolute location estimator 33, and the display 34 have the same configurations as those of Embodiment 1 illustrated in FIG. 3. The relative location estimator 36 and the absolute location estimator 33 are implemented, for example, by a CPU using RAM as working memory and executing a program stored in a ROM as appropriate.

The measurement information receiver 35 receives the measurement information transmitted by the second facility device 20. The measurement information receiver 35 supplies the received measurement information to the relative location estimator 36.

The relative location estimator 36 estimates the relative location between the first facility device 10 and the second facility device 20 based on the radio wave intensity and the phase difference indicated by the measurement information received by the measurement information receiver 35. For example, the relative location estimator 36 calculates a distance between the first facility device 10 and the second facility device 20 in accordance with the radio wave intensity. The relative location estimator 36 calculates an angle between the first facility device 10 and the second facility device 20 in accordance with the phase difference. The relative location estimator 36 estimates a relative location of the second facility device 20 with respect to the first facility device 10 based on the calculated distance and angle. The relative location estimator 36 stores the estimated relative location in the storage 32.

The storage 32 stores the relative location estimated by the relative location estimator 36. Similarly to Embodiment 1, the storage 32 stores the absolute location of the first facility device 10 whose installation location is known and the installation specifications.

Similarly to Embodiment 1, the absolute location estimator 33 estimates the absolute location of the second facility device 20 with reference to the information stored in the storage 32. For example, the absolute location estimator 33 estimates the absolute location of the second facility device 20 based on the relative location between the first facility device 10 and the second facility device 20 estimated by the relative location estimator 36, the absolute location, which is the installation location of the first facility device 10, and the installation specification stipulated for installation of the facility devices. Specifically, the absolute location estimator 33 uses as a reference the absolute location of the first facility device 10 whose installation location is known, to estimate the absolute location of the second facility device 20, the installation location of which is unknown, in accordance with the relative location of the second facility device 20 with respect to the first facility device 10. In this estimation, the absolute location estimator 33 uses the installation specifications to improve accuracy of the estimated absolute location.

Similarly to Embodiment 1, the display 34 displays the installation location of each of the facility devices. For example, the display 34 displays an icon indicating the second facility device 20 while superimposing the icon at a corresponding position on a floor plan based on the absolute location of the second facility device 20 estimated by the absolute location estimator 33. The display 34 may display an icon indicating the first facility device 10 while further superimposing the icon at a corresponding position on the floor plan similarly based on the absolute location of the first facility device 10 whose installation location is known.

Figure 9:
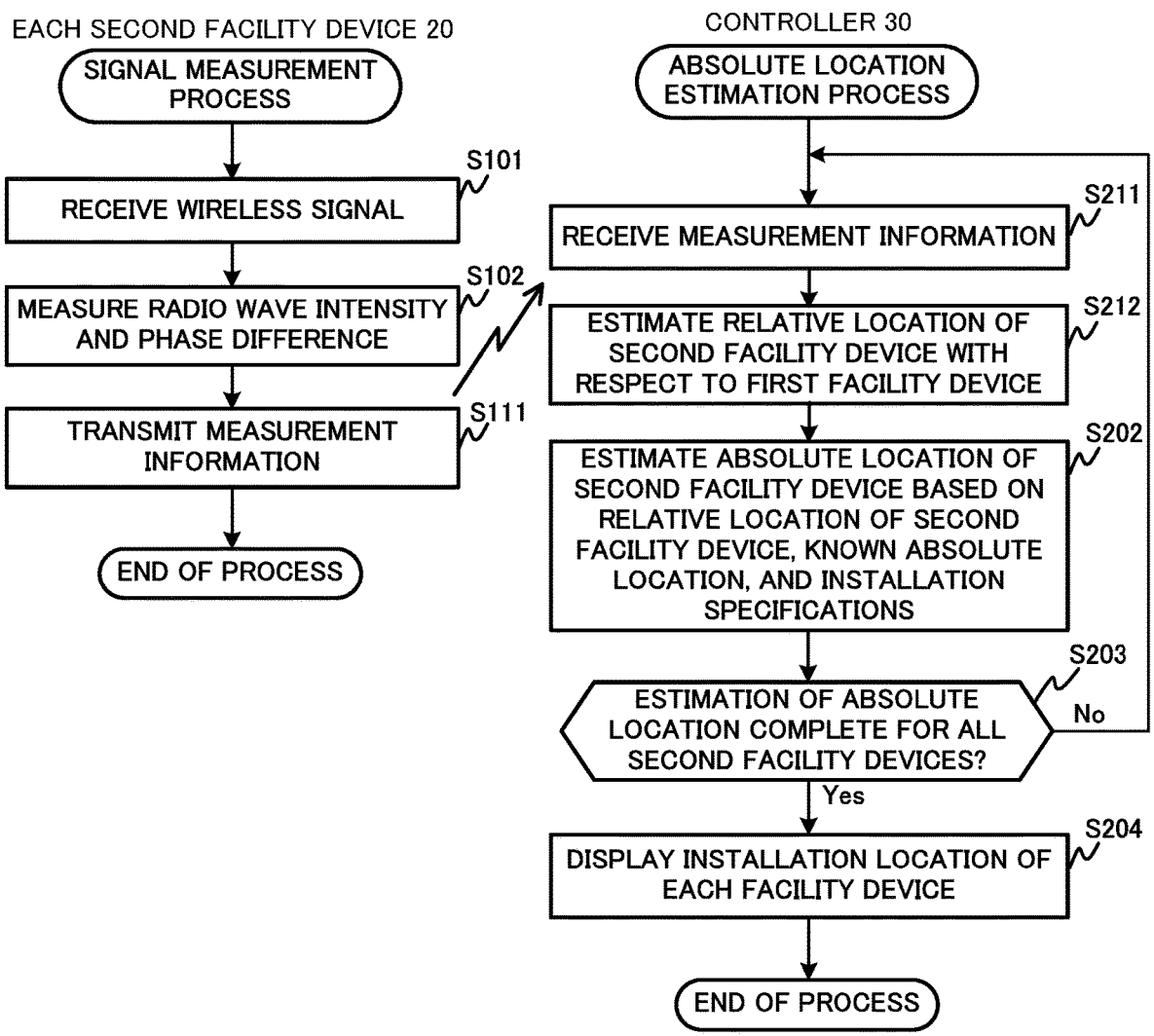
FIG. 9 is a flowchart for illustrating a signal measurement process and an absolute location estimating process according to Embodiment 2 of the present disclosure.

Operation of the facility device system 1 according to Embodiment 2 having such a configuration is described below with reference to FIG. 9. FIG. 9 is a flowchart illustrating an example of a signal measurement process and an absolute location estimation process according to Embodiment 2 of the present disclosure. The same reference numerals are assigned to the same processing steps as those of Embodiment 1.

The signal measurement process, which is one of the processes, is executed by each of the second facility devices 20, and the absolute location estimation process, which is the other process, is executed by the controller 30. Although not illustrated, a process of transmitting wireless signals is assumed to be carried out in the first facility device 10 in parallel to the signal measurement process and the absolute location estimation process. These processes are executed, for example, upon turn-on of power to the first facility device 10, the second facility device 20, and the controller 30. In addition, these processes may be executed in a case where a predetermined operation is input to the controller 30.

First, the second facility device 20 receives a wireless signal transmitted by the first facility device 10 (step S101). Specifically, upon turn-on of power, the wireless signal including the device ID is transmitted by the wireless signal transmitter 11 from the first facility device 10. The wireless signal receiver 21 therefore then receives this wireless signal.

The second facility device 20 measures a radio wave intensity and a phase difference (step S102). Specifically, the wireless signal receiver 21 measures the radio wave intensity and phase difference for the wireless signal received in step S101.

The second facility device 20 transmits the information about the relative location to the controller 30 (step S111). Specifically, the measurement information transmitter 24 transmits to the controller 30 the information indicating the radio wave intensity and the phase difference measured in step S102. The measurement information transmitter 24 adds the device ID of the first facility device 10 extracted by the wireless signal receiver 21 and its own device ID so as to be able to identify which first facility device 10 and which second facility device 20 the measurement information is between.

The controller 30 receives the measurement information (step S211). Specifically, the relative location receiver 31 receives the measurement information transmitted by the second facility device 20.

The controller 30 estimates the relative location of the second facility device with respect to the first facility device 10 (step S212). Specifically, the relative location estimator 36 estimates the relative location between the first facility device 10 and the second facility device 20 based on the radio wave intensity and the phase difference indicated by the measurement information received in step S211. For example, the relative location estimator 36 calculates a distance between the first facility device 10 and the second facility device 20 in accordance with the radio wave intensity. The relative location estimator 36 calculates an angle between the first facility device 10 and the second facility device 20 in accordance with the phase difference. Then the relative location estimator 36 estimates a relative location of the second facility device 20 with respect to the first facility device 10 based on the calculated distance and angle.

The controller 30 estimates an absolute location of the second facility device 20 based on the relative location of the second facility device 20, the known absolute location, and the installation specifications (step S202). Specifically, the absolute location estimator 33 estimates the absolute location of the second facility device 20 based on the relative location between the first facility device 10 and the second facility device 20 estimated in step S212, the absolute position that is the installation position of the first facility device 10, and the installation specifications for installation of the facility devices. For example, the absolute location estimator 33 uses as a reference the absolute location of the first facility device 10, the installation location of which is known, to estimate the absolute location of the second facility device 20, the installation location of which is unknown, in accordance with the relative location of the second facility device 20 with respect to the first facility device 10. In this estimation, the absolute location estimator 33 improves accuracy of the absolute location based on the installation specifications stored in the storage 32, for example, by correcting the installation interval, the installation angle, and/or the like.

The controller 30 determines, for all the second facility devices 20, whether or not estimation of the absolute location is complete (step S203). In a case where the controller 30 determines that estimation for all the second facility devices 20 is not complete (No in step S203), the controller 30 returns the processing to step S211.

In a case where controller 30 determines that estimation for all the second facility devices 20 is complete (Yes in step S203), the controller 30 displays the installation location of each facility device (step S204). Specifically, the display 34, for example, displays an icon indicating the second facility device 20 while superimposing the icon at a corresponding position on a floor plan based on the absolute location of the second facility device 20 estimated in step S202. The display 34 may display an icon indicating the first facility device 10 while further superimposing the icon at a corresponding position on the floor plan based on the absolute location of the first facility device 10 whose installation location is known.

Through the signal measurement process, the measurement information about the wireless signal transmitted by the first facility device 10, that is, the measurement information indicating the radio wave intensity and the phase difference is transmitted to the controller 30 from each second facility device 20. Through the absolute location estimation process, the relative location of the second facility device 20 with respect to the first facility device 10 is estimated, and the absolute location of the second facility device 20 is estimated based on the relative location of the second facility device 20, the absolute location of the first facility device 10, and installation specifications. In this estimation, accuracy of the absolute location is improved based on the installation specifications, for example, by correcting the installation interval, the installation gap, and/or the like.

This results in higher accuracy of estimation of the installation location of the second facility devices 20.

In Embodiment 2 described above, the first facility device 10 whose installation location is known transmits a wireless signal, and the second facility device 20 whose installation location is unknown measures the wireless signal and transmits the measurement information to the controller 30. However, roles of the first facility device 10 and the second facility device 20 may be switched. Specifically, similarly to the modifications of Embodiment 1 described above, the configurations of the first facility device 10 and the second facility device 20 are switched with each other, and the second facility device 20 whose installation location is unknown transmits a wireless signal, and the first facility device 10 whose facility device is known measures the wireless signal measures the wireless signal and transmits the measurement information to the controller 30. Then the controller 30 receives the measurement information, estimates a relative location of the first facility device 10 with respect to the second facility device 20, and estimates an absolute location of the second facility device 20 based on the relative location, the absolute location of the first facility device 10, and the installation specifications. Similarly in this case, the installation location of the second facility device 20 can be estimated with higher accuracy.

Other Embodiments

In the embodiments described above, the controller 30 estimates the absolute location of the second facility device 20, but the absolute location may be estimated, for example, using a server on the Internet. A facility device system according to another embodiment of the present disclosure is described with reference to FIG. 10.

Figure 10:
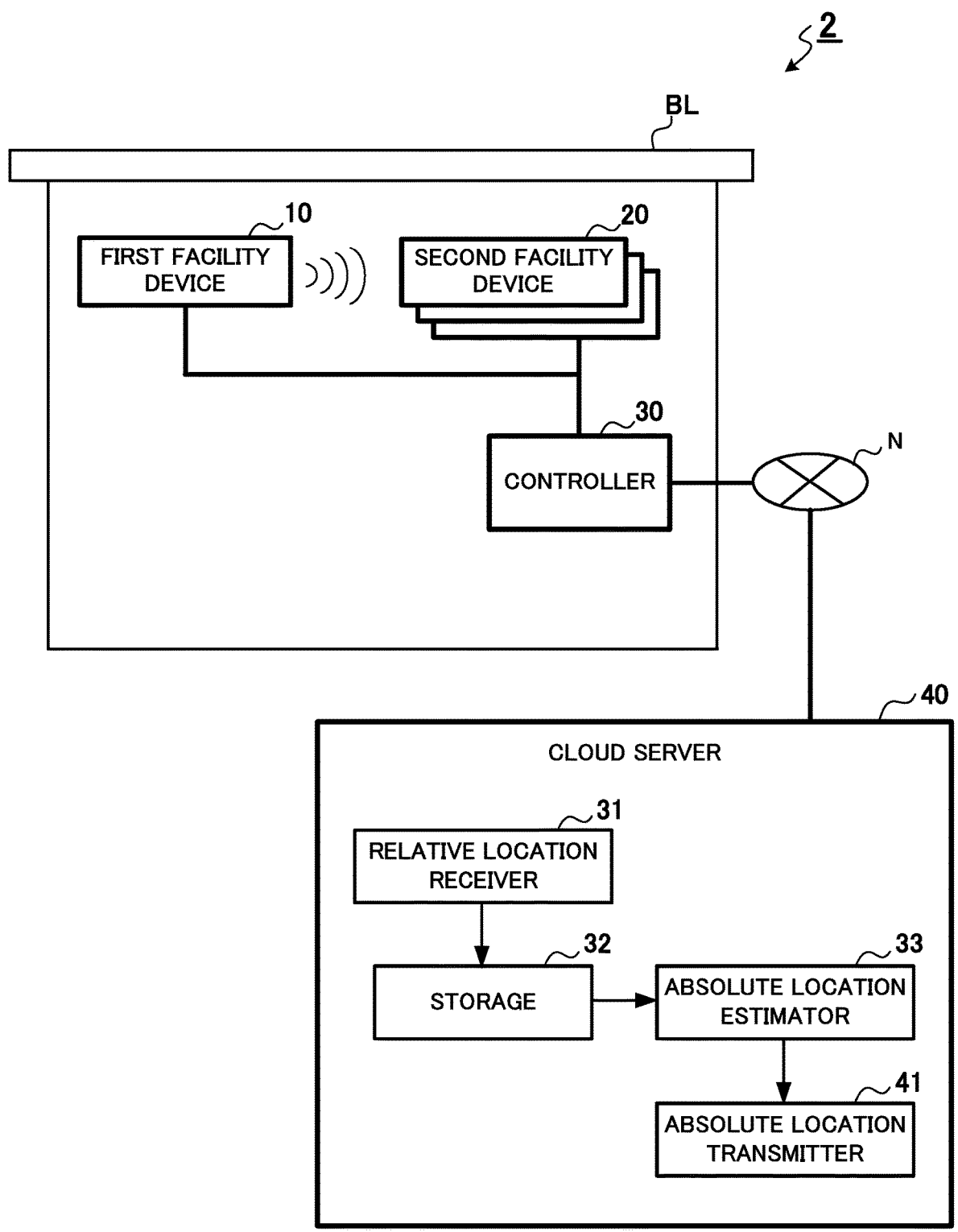
FIG. 10 is a diagram illustrating an overall configuration of a facility device system according to another embodiment of the present disclosure and a configuration of a cloud server.

FIG. 10 is a diagram illustrating an example of an overall configuration of a facility device system 2 according to another embodiment of the present disclosure and a configuration of a cloud server 40. As illustrated, the facility device system 2 includes a first facility device 10, a second facility device 20, a controller 30, and a cloud server 40. The controller 30 and the cloud server 40 are communicatively connected to each other via the Internet N.

The first facility device 10 and the second facility device 20 have the same configuration as that of Embodiment 1 illustrated in FIG. 3. The controller 30 is configured to receive information indicating a relative location transmitted by the second facility device 20 and transmit the received information to the cloud server 40 as is.

The cloud server 40 has almost the same configuration as the configuration of the controller 30 according to Embodiment 1 illustrated in FIG. 3. Specifically, the cloud server 40 includes the relative location receiver 31, which is an example of the relative location receiving means, the storage 32, the absolute location estimator 33, which is an example of the absolute location estimating means, and an absolute location transmitter 41. The absolute location estimator 33 is implemented, for example, by a CPU using a RAM as working memory and executing a program stored in a ROM as appropriate.

The relative location receiver 31 receives information indicating the relative location transmitted by the controller 30. The relative location receiver 31 stores the received information in the storage 32.

The storage 32 stores information indicating the relative location received by the relative location receiver 31. The storage 32 also stores an absolute location of the first facility device 10, the installation location of which is known, and installation specifications.

The absolute location estimator 33 estimates an absolute location of the second facility device 20 with reference to the information stored in the storage 32. For example, the absolute location estimator 33 estimates an absolute location of the second facility device 20 based on the relative location between the first facility device 10 and the second facility device 20 indicated by the information received by the relative location receiver 31, the absolute location that is the installation location of the first facility device 10, and the installation specifications stipulated for installation of the facility devices. Specifically, the absolute location estimator 33 uses as a reference the absolute location of the first facility device 10, the installation location of which is known, to estimate the absolute location of the second facility device 20, the installation location of which is unknown, in accordance with the relative location of the second facility device 20 with respect to this first facility device 10. In this estimation, the absolute location estimator 33 uses the installation specifications to improve accuracy of the absolute location to be estimated.

The absolute location transmitter 41 transmits the absolute location of the second facility device 20 estimated by the absolute location estimator 33 to the controller 30, a user's terminal, or the like. The absolute location transmitter 41 may transmit, to the controller 30, the user's terminal, or the like, the absolute location including that of the first facility device 10 whose installation location is known.

Similarly in this facility device system 2, the absolute location of the second facility device 20 is estimated in the cloud server 40 based on the relative location of the second facility device 20, the absolute location of the first facility device 10, and the installation specifications. In this estimation, accuracy of the installation location is improved based on the installation specifications, for example, by correcting the installation interval, the installation angle, and/or the like. This results in higher accuracy of estimation of the installation location of the second facility device 20.

Figure 8:
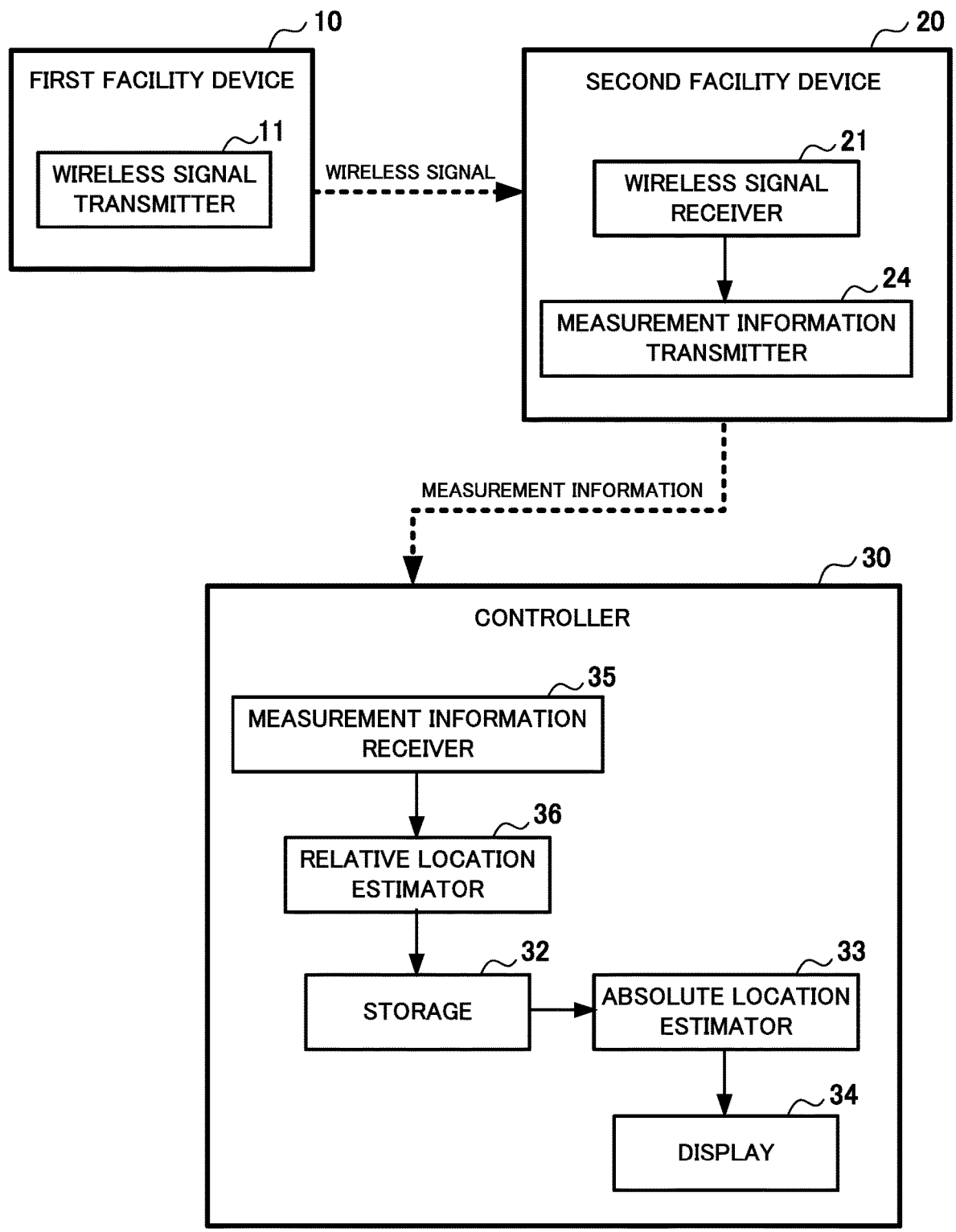
FIG. 8 is a diagram illustrating a configuration of a first facility device, a second facility device, and a controller according to Embodiment 2 of the present disclosure.

FIG. 10 illustrates that the cloud server 40 includes almost the same configuration as that of the controller 30 according to Embodiment 1 illustrated in FIG. 3, but the cloud server 40 may include almost the same configuration as that of the controller 30 according to Embodiment 2 illustrated in FIG. 8.

In Embodiments 1 and 2 and the other embodiments described above, the program executable by first facility device 10, the second facility device 20, the controller 30, and the cloud server 40 can be stored for distribution in a computer-readable recording medium, such as compact disc read only memory (CD-ROM), a digital versatile disc (DVD), a magneto-optical disc (MO), a universal serial bus (USB) memory, a memory card, or the like. Then installing the program into a dedicated or general-purpose computer also enables the computer to function as the first facility device 10, the second facility device 20, the controller 30, and the cloud server 40 in Embodiments 1 and 2 and the other embodiments described above.

The above-described program may be stored on a disk device or the like of a server device on a communication network such as the Internet to enable the program to be downloaded to the computer, for example by superimposing the program onto a carrier wave. The above-described functions can also be achieved by starting and executing the program while transferring the program via a communication network. The above-described functions can also be achieved by executing all or a part of the program on the server device and executing the program while the computer sends and receives information relating to the processing via the communication network.

When the above-described functions are, for example, achieved partly by an operating system (OS) and an application program or in cooperation between the OS and the application program, the program other than the OS may be stored on the above recording medium for distribution or may be downloaded to the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be applied with advantage to a location estimation apparatus, a facility device system, a location estimation method, and a program capable of estimating an installation location of a facility device with higher accuracy.

REFERENCE SIGNS LIST 1, 2 Facility device system
10 First facility device
11 Wireless signal transmitter
20 Second facility device
21 Wireless signal receiver
22 Relative location estimator
23 Relative location transmitter
24 Measurement information transmitter
30 Controller
31 Relative location receiver
32 Storage
33 Absolute location estimator
34 Display
35 Measurement information receiver
36 Relative location estimator
40 Cloud server
41 Absolute location transmitter

The invention claimed is:

1. A location estimation apparatus to be communicatively connected to at least two facility devices including a first facility device whose installation location is known and a second facility device whose installation location is unknown, the location estimation apparatus comprising:
  processing circuitry
    to receive measurement information about a radio wave intensity and a phase difference of a wireless signal, the measurement information being sent from any of the facility devices,
    to estimate a relative location between the first facility device and the second facility device based on the received measurement information, and
    to estimate an absolute location of the second facility device based on the estimated relative location, the installation location of the first facility device, and installation specifications stipulated for the facility devices, wherein the installation specifications stipulate at least one of an installation interval of the facility devices or an installation angle of the facility devices.

2. The location estimation apparatus according to claim 1, wherein the processing circuitry displays installation locations of the facility devices including the estimated absolute location of the second facility device.

3. A facility device system, comprising:

at least two facility devices including a first facility device whose installation location is known and a second facility device whose installation location is unknown; and a controller to be communicatively connected to the facility devices and control the facility devices, wherein the first facility device transmits a wireless signal, the second facility device comprises first processing circuitry to receive the wireless signal transmitted by the first facility device, to estimate a relative location between the first facility device and the second facility device based on a radio wave intensity and a phase difference of the received wireless signal, and to transmit, to the controller, information indicating the estimated relative location of the second facility device, and the controller comprises second processing circuitry to receive the information transmitted by the second facility device, and to estimate an absolute location of the second facility device based on the relative location indicated by the received information, the installation location of the first facility device, and installation specifications stipulated for the facility devices, wherein the installation specifications stipulate at least one of an installation interval of the facility devices or an installation angle of the facility devices.

4. A location estimation method to be executed by a controller to be communicatively connected to at least two facility devices including a first facility device whose installation location is known and a second facility device whose installation location is unknown, the location estimation method comprising:

receiving measurement information about a radio wave intensity and a phase difference of a wireless signal, the measurement information being sent from any of the facility devices;

estimating a relative location between the first facility device and the second facility device based on the received measurement information; and estimating an absolute location of the second facility device based on the estimated relative location, the installation location of the first facility device, and installation specifications stipulated for the facility devices, wherein the installation specifications stipulate at least one of an installation interval of the facility devices or an installation angle of the facility devices.

5. A non-transitory computer-readable recording medium storing a program, the program causing a computer communicatively connected to at least two facility devices, the facility devices including a first facility device whose installation location is known and a second facility device whose installation location is unknown, to function as:

a relative location receiver to receive measurement information about a radio wave intensity and a phase difference of a wireless signal, the measurement information being sent from any of the facility devices;

a relative location estimator to estimate a relative location between the first facility device and the second facility device based on the received measurement information; and an absolute location estimator to estimate an absolute location of the second facility device based on the estimated relative location, the installation location of the first facility device, and installation specifications stipulated for the facility devices, wherein the installation specifications stipulate at least one of an installation interval of the facility devices or an installation angle of the facility devices.

* * * * *